United States Patent
Kandavalli et al.

(10) Patent No.: US 11,440,635 B1
(45) Date of Patent: Sep. 13, 2022

(54) PRELOADED AIRCRAFT LINKAGE ASSEMBLIES WITH REDUCED NOISE DURING LOAD REVERSAL

(71) Applicant: Gulfstream Aerospace Corporation, Savannah, GA (US)

(72) Inventors: Vijay Sekhar Kandavalli, Savannah, GA (US); Linga Rajagopal Movva, Savannah, GA (US); Kevin Jones, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 68 days.

(21) Appl. No.: 17/301,800

(22) Filed: Apr. 14, 2021

(51) Int. Cl.
*B64C 1/26* (2006.01)
*B64F 5/10* (2017.01)

(52) U.S. Cl.
CPC . *B64C 1/26* (2013.01); *B64F 5/10* (2017.01)

(58) Field of Classification Search
CPC .......................................................... B64C 1/26
See application file for complete search history.

(56) References Cited

U.S. PATENT DOCUMENTS

| | | | | |
|---|---|---|---|---|
| 8,740,150 B2* | 6/2014 | Werth | ...................... | B64C 1/26 244/131 |
| 8,991,762 B2* | 3/2015 | Voss | .......................... | B64C 1/26 244/119 |
| 9,248,902 B2* | 2/2016 | Benthien | ................... | B64C 1/26 |
| 9,399,508 B2* | 7/2016 | Lakic | ........................ | B64C 1/26 |
| 9,701,412 B2* | 7/2017 | Stretton | ................. | B64D 27/26 |
| 10,106,240 B2* | 10/2018 | Lakic | ........................ | B64C 1/26 |
| 10,538,303 B2* | 1/2020 | Kijak | ...................... | E05C 17/02 |
| 11,305,861 B2* | 4/2022 | Edwards | ................... | B64C 1/26 |
| 2011/0210206 A1* | 9/2011 | Werth | ....................... | B64C 1/26 244/131 |
| 2011/0266398 A1* | 11/2011 | Voss | .......................... | B64C 1/26 244/45 R |
| 2013/0327882 A1* | 12/2013 | Benthien | .................. | B64D 1/08 244/48 |
| 2015/0097076 A1* | 4/2015 | Lakic | ........................ | B64C 3/38 244/46 |
| 2016/0348755 A1* | 12/2016 | Ritz | ........................... | F16H 7/08 |
| 2017/0015402 A1* | 1/2017 | Lakic | ........................ | B64C 1/26 |
| 2019/0002077 A1* | 1/2019 | Kijak | ...................... | E05D 15/48 |
| 2020/0017188 A1* | 1/2020 | Edwards | ................... | B64C 1/26 |

* cited by examiner

*Primary Examiner* — Philip J Bonzell
(74) *Attorney, Agent, or Firm* — LKGlobal | Lorenz & Kopf, LLP

(57) ABSTRACT

An aircraft includes a fuselage, a wing extending out from the fuselage, and a joint coupling the wing to the fuselage. The joint includes a first fitting fixed to the fuselage, a second fitting fixed to the wing, a link assembly pivotably coupled to the first fitting and to the second fitting, and a strap coupled to the link assembly at the first fitting and at the second fitting based on the free play clearance as defined by the manufacturing of the link assembly. The link assembly is configured to support the wing during operation of the aircraft and has a free play clearance defined by a manufacturing of the joint falling within a designed dimensional tolerance of the joint. The strap is further configured to bias the link assembly to restrict movement of the link assembly within the free play clearance during load reversal in the joint.

19 Claims, 5 Drawing Sheets

PRELOADED AIRCRAFT LINKAGE ASSEMBLIES WITH REDUCED NOISE DURING LOAD REVERSAL

TECHNICAL FIELD

The present disclosure relates generally to aircraft linkage assemblies, and more particularly relates to aircraft linkage assemblies that are preloaded to restrict free play movement during load reversal.

BACKGROUND

Linkage assemblies for coupling aircraft wings to an aircraft fuselage include several components. Each of these components is manufactured to a tolerance that is defined by the manufacturing techniques used to manufacture the component. The tolerance represents the expected range of actual dimensions of the component relative to the designed or desired dimensions. For example, a component may be designed to have a length of 100 mm with a tolerance of plus or minus 5 mm. Accordingly, any given part manufactured with such tolerances may be as short as 95 mm or as long as 105 mm.

As the number of components in the linkage assemblies increases, the tolerances add or stack. As the tolerances stack, the linkage assembly has more clearance between components. This clearance leads to "free play," or the ability of the parts to move relative to each other due to the accumulated tolerances of the components. Joint free play produces audible noise during load reversals as the various components impact each other within the joint.

One solution for reducing the free play is to manufacture the components with tighter tolerances. Manufacturing to tighter tolerances, however, adds cost to the manufactured part and part rejections during quality checks.

Accordingly, it is desirable to provide linkage assemblies that produce less audible noise than is produced by conventional linkage assemblies. In addition, it is desirable to reduce the audible noise without the increased costs associated with tighter tolerances. Furthermore, other desirable features and characteristics will become apparent from the subsequent summary and detailed description and the appended claims, taken in conjunction with the accompanying drawings and the foregoing technical field and background.

BRIEF SUMMARY

An aircraft, an aircraft linkage assembly, and a method of reducing noise in a linkage assembly during operation of an aircraft are disclosed herein.

In a first non-limiting embodiment, an aircraft includes a fuselage, a wing extending out from the fuselage, and a joint coupling the wing to the fuselage. The joint includes a first fitting fixed to the fuselage, a second fitting fixed to the wing, a link assembly pivotably coupled to the first fitting and to the second fitting, and a strap coupled to the link assembly at the first fitting and at the second fitting based on the free play clearance as defined by the manufacturing of the link assembly. The link assembly is configured to support the wing during operation of the aircraft and has a free play clearance defined by a manufacturing of the joint falling within a designed dimensional tolerance of the joint. The strap is further configured to bias the link assembly to restrict movement of the link assembly within the free play clearance during load reversal in the joint.

In another non-limiting embodiment, a joint for a structure subjected to load reversal between a first structure and a second structure includes a first fitting, a second fitting, a link assembly, and a strap. The first fitting is fixed to the first structure. The second fitting is fixed to the second structure. The link assembly is pivotably coupled to the first fitting and to the second fitting. The link assembly has a free play clearance defined by a manufacturing of the joint and falling within a designed dimensional tolerance of the joint. The strap is coupled to the link assembly at the first fitting and at the second fitting based on the free play clearance as defined by the manufacturing of the link assembly and interfacing hardware. The strap is further configured to bias the link assembly to restrict movement of the link assembly within the free play clearance during load reversal in the joint.

In another non-limiting embodiment, a method of reducing noise in a joint during operation of an aircraft includes installing a linkage assembly between a fuselage and a wing of the aircraft to support the wing. The method further includes preloading the linkage assembly. The method further yet includes determining a free play clearance in the linkage assembly due to manufacturing tolerance stacking. The method further yet includes fabricating a strap based on the free play clearance. The method further yet includes installing the strap on the linkage assembly such that the strap biases the linkage assembly to restrict free play movement during pressurized flight of the aircraft.

BRIEF DESCRIPTION OF THE DRAWINGS

The present disclosure will hereinafter be described in conjunction with the following drawing figures, wherein like numerals denote like elements.

FIG. 7 illustrates the joint of FIG. 2 undergoing load reversal in accordance with some embodiments.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

In general, the embodiments described herein include vibration alleviation systems for structural assemblies with free play subjected to load reversals. The embodiments load a joint with free play under pre-load thereby reducing the intensity of vibration during load reversals.

One example of a pre-loading system includes a strap assembly with at least six components. In some embodiments, the six components are two straps and four strap fittings. A conventional link assembly is first installed and held under a certain loading condition. While under the loading condition, the strap assembly is fabricated and installed on the link assembly such that strap assembly is pre-stressed when the pre-load is removed during operation, thereby reducing the intensity of vibration and noise. These embodiments reduce the reliance on tighter tolerance hardware traditionally used to eliminate free play in the joint.

A greater understanding of the embodiments may be obtained through a review of the illustrations accompanying this application together with a review of the detailed description that follows.

Figure 1:
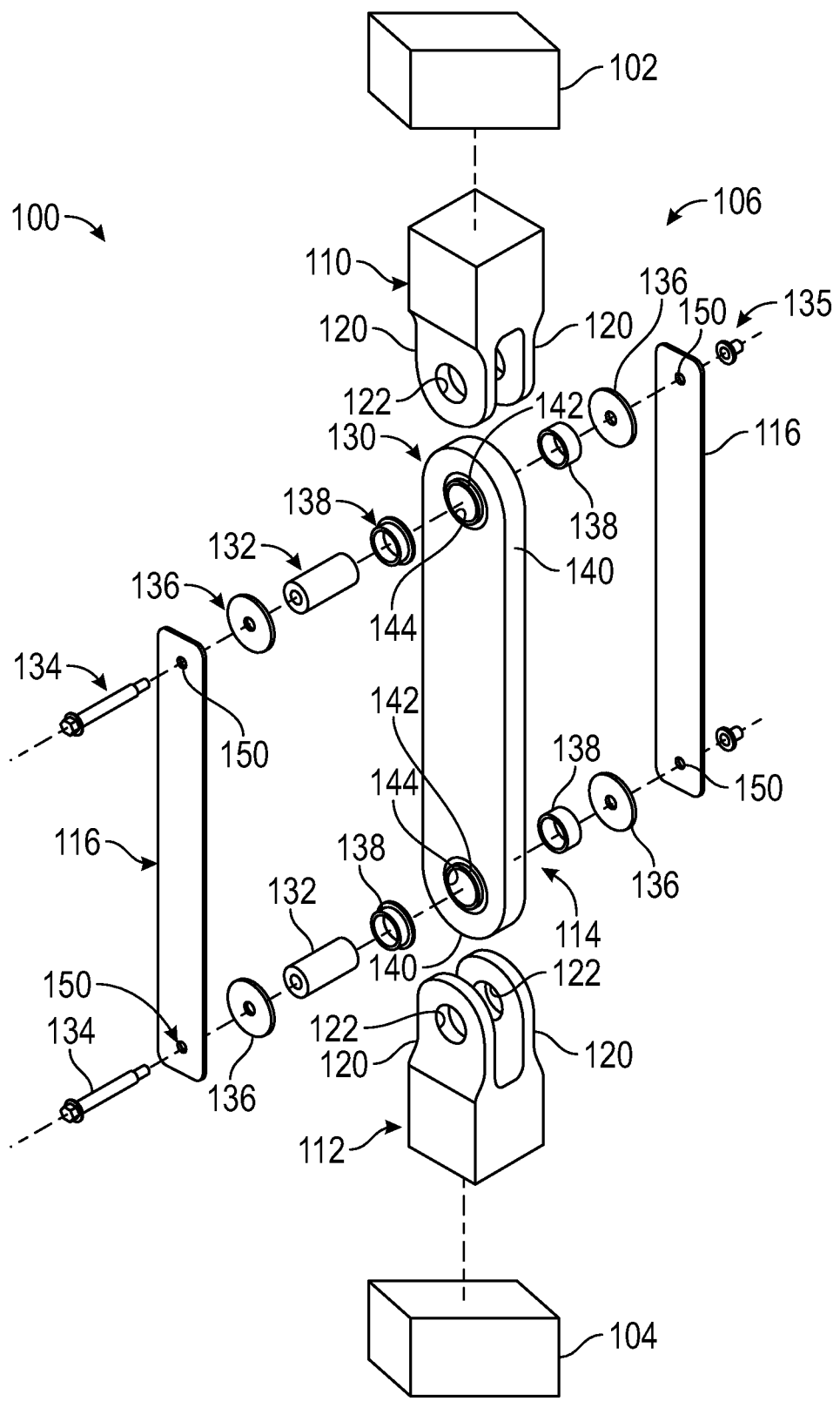
FIG. 1 is a simplified view of an aircraft assembly with a joint in accordance with some embodiments of the present disclosure.

FIG. 1 is an exploded perspective view of an aircraft assembly 100. Aircraft assembly 100 may be any type of fixed wing aircraft including, without limitation, a subsonic aircraft, a supersonic aircraft, a propeller driven aircraft, a jet powered aircraft, a commercial airliner, a private business jet, a cargo aircraft, a military aircraft, and any other type of aircraft where wings are supported by a joint between the fuselage and the wing. Additionally, although the joint of the present disclosure is being described and explained in the context of its application for linking aircraft wings to fuselages, it should be understood that the joints of the present disclosure are not limited to connections between fuselages and wings. Rather, the joints of the present disclosure may be used on any type of structure that experiences load reversal during operation. The linkage assemblies are not limited to use in vehicles and may be employed in other applications unrelated to vehicles such as, and without limitation, buildings and bridges.

Aircraft assembly 100 includes a fuselage 102, a wing 104, and a joint 106. Fuselage 102 and wing 104 are similar to conventional components of an aircraft. In the example provided, fuselage 102 and wing 104 are coupled in a low wing configuration on a transport category aircraft. As will be appreciated by those of ordinary skill in the art, wing 104 extends outward from fuselage 102 and is supported by fuselage 102 through at least one joint 106.

Figure 2:
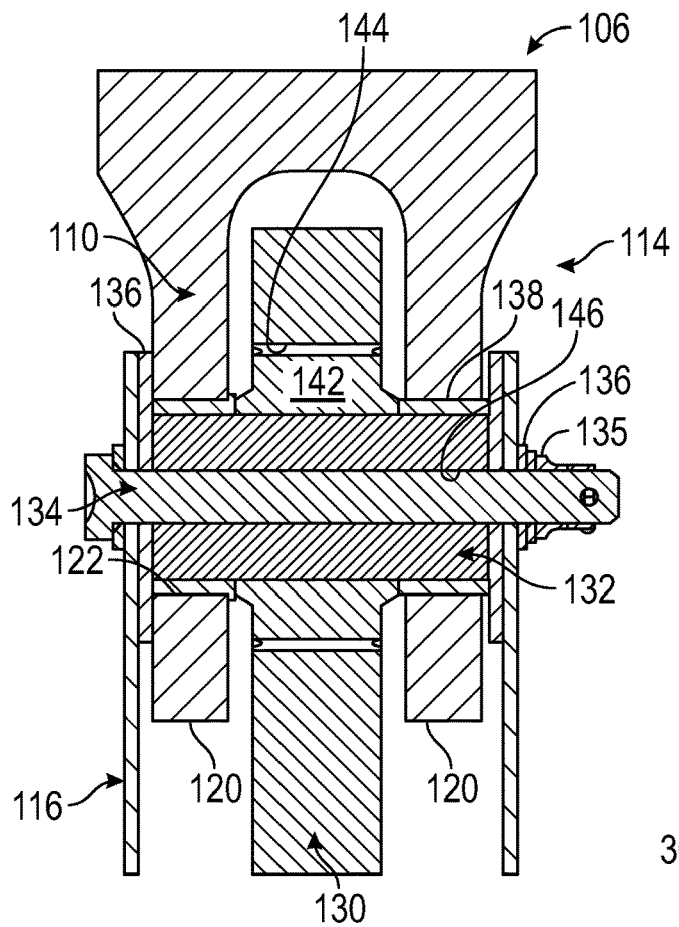
FIG. 2 is a cross section view of the joint of FIG. 1 in accordance with some embodiments.

Referring now to FIG. 2, and with continued reference to FIG. 1, joint 106 is illustrated in a cross-section view. Joint 106 couples wing 104 to fuselage 102. Joint 106 includes a first fitting 110, a second fitting 112, a link assembly 114, and straps 116.

First fitting 110 is fixed to fuselage 102. As used herein, the term "fixed to" means non-rotatably and non-slidingly connected together to act as a single piece. First fitting 110 defines a pair of flanges 120 extending out toward second fitting 112. Flanges 120 are configured to receive link assembly 114. In the example provided, flanges 120 are parallel to each other with a space between flanges 120 sized to accommodate link assembly 114. Each of flanges 120 defines a fitting aperture 122. Fitting aperture 122 is configured to receive components of link assembly 114 for pivotably coupling link assembly 114 to first fitting 110.

Second fitting 112 is fixed to wing 104. Second fitting 112 is similar to first fitting 110, where like numbers refer to like components. Second fitting 112, however, is oriented such that flanges 120 of second fitting 112 extend away from wing 104 toward fuselage 102.

Link assembly 114 includes a link bar 130, shear pins 132, bolts 134, washers 136, and bushings 138. Link assembly 114 pivotably couples to first fitting 110 and to second fitting 112 to support wing 104 during operation of the aircraft. Link assembly 114 has a free play clearance defined by a manufacturing of each individual joint 106 assembled, as will be shown in FIGS. 3-5. The free play clearance falls within a designed dimensional tolerance of joint 106 according to the engineered design of joint 106.

Link bar 130 has two end portions 140 that each accommodate a bearing 142. Each of end portions 140 defines a link aperture 144 in which bearings 142 are disposed. In some embodiments, bearings 142 are omitted. Each of end portions 140 is located between flanges 120 of the respective fitting 110 or 112 when joint 106 is assembled. Bearings 142 or link aperture 144 are configured to accommodate shear pin 132 to secure link bar 130 to flanges 120 of the respective fitting 110 or 112.

Shear pins 132 are at least partially disposed within fitting aperture 122 and at least partially disposed within link aperture 144 and bearing 142. During operation of the aircraft, forces on fuselage 102 and wing 104 act on fitting 110 or 112, respectively. The fitting transfers the forces to shear pin 132 at fitting apertures 122 of flanges 120. Shear pin 132 transfers the forces to bearing 142 and link bar 130 at link aperture 144. Link bar 130 transfers the forces to the other end portion 140 where the forces transfer to the other fitting 110 or 112 through the other shear pin 132 in a similar but reversed manner.

Shear pins 132 each define a bolt aperture 146 that is coaxial with a longitudinal direction of the respective shear pin 132. Bolt aperture 146 is configured to receive bolt 134.

Bolt 134 restricts disassembly of link joint 106 and secures straps 116 to link assembly 114. In the example provided, bolt 134 directly passes through straps 116, washers 136, and shear pin 132. Bolt 134 is secured within joint 106 by a nut 135.

Straps 116 act as a link coupled in parallel with link assembly 114 between first fitting 110 and second fitting 112. In the example provided, straps 116 are flat metal bars that elastically deform to bias the link assembly during operation of the aircraft.

Straps 116 define strap apertures 150 through which bolt 134 passes. Strap apertures 150 are drilled after link assembly 114 is coupled to fittings 110 and 112 and a pre-load is applied between the fittings 110 and 112. For example, wing 104 may be installed onto fuselage 102 using link assembly 114. Wing 104 supports fuselage 102 through wing mounted landing gear. Accordingly, gravity pulls fuselage 102 down toward wing 104, resulting in a compressive load in link assembly 114. The compressive load reverses to a tensile load after pressurization of fuselage 102 at cruise altitude of the aircraft.

The compressive load transfers through shear pin 132. Accordingly, bolt 134 may be removed if it was already installed during assembly of joint 106. Strap apertures 150 are then drilled based on the free play clearance as defined by the manufacturing of the link assembly. For example, the distance between bolt apertures 146 may be measured to determine the drilling locations of strap apertures 150. By measuring the distance after assembly, the actual dimensions as manufactured may be accounted for in the strap aperture placement. As loads on joint 106 change, straps 116 bias link assembly 114 to restrict movement of link assembly 114 within the free play clearance during load reversal in joint 106.

In the example provided, strap apertures 150 have a diameter that is substantially the same as a diameter of bolts 134. Strap apertures 150 are also aligned with bolt 134 when link assembly 114 is loaded by a predetermined pre-load, such as the compressive load on joint 106 while the aircraft is stationary on the ground.

Figure 3:
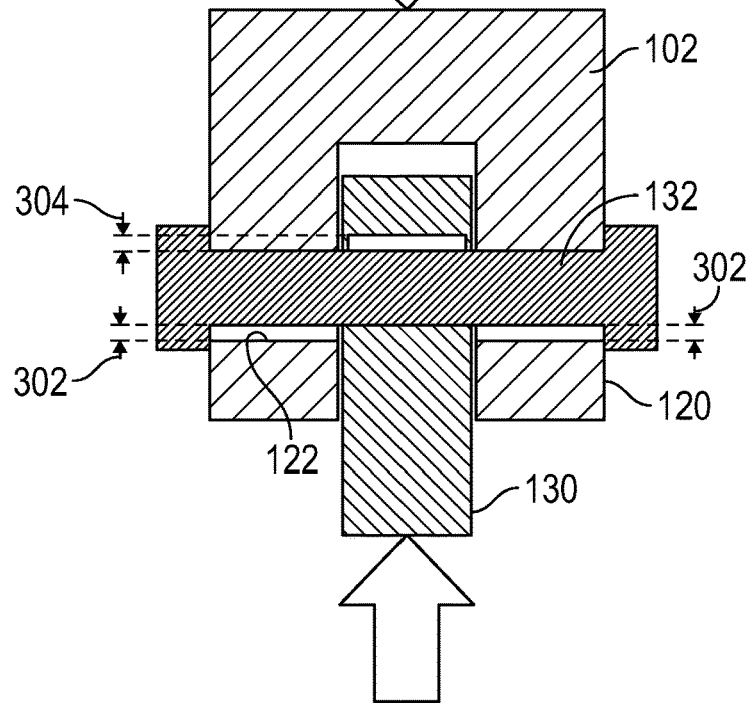
FIGS. 3-5 illustrate joints undergoing load reversals in accordance with some embodiments.
Figure 4:
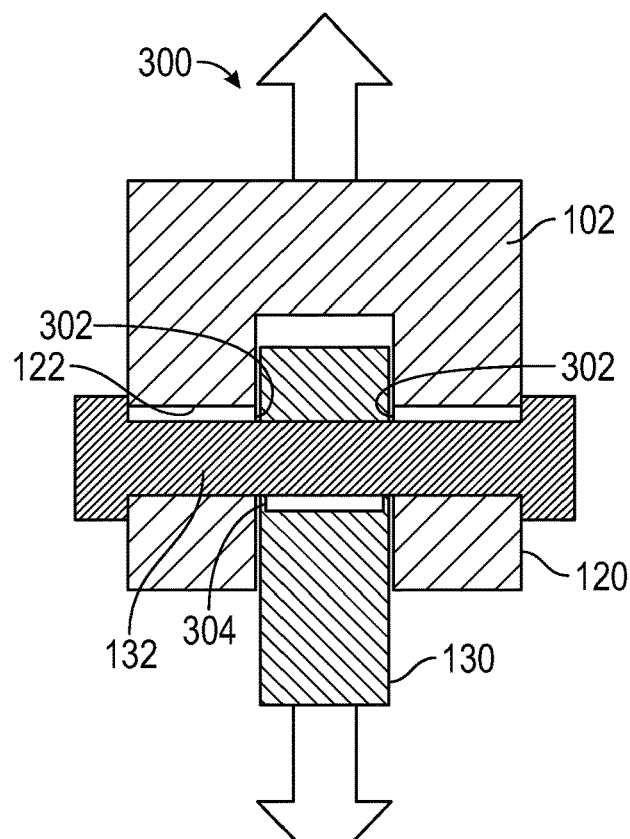

Referring now to FIGS. 3-4, and with continued reference to FIGS. 1-2, operation of a joint 300 is illustrated in simplified cross-section views. Joint 300 is similar to joint 106, where like numbers refer to like components. Joint 300, however, does not include straps 116.

FIG. 3 illustrates a joint 300 under a compressive load, such as when wings 104 are supporting fuselage 102 on the ground. The compressive load presses fitting 110 against an outer side (fitting side) of shear pin 132. The compressive load also presses link bar 130 against an inner side (link bar side) of shear pin 132. A first free play clearance 302 is at least partially defined by a difference in dimensions between an inner surface of fitting aperture 122 and an outer surface of shear pin 132. A second free play clearance 304 is at least partially defined by a difference in dimensions between an inner surface of bearing 142 and an outer surface of shear pin 132. Second free play clearance 304 may be also partially defined by a difference in dimensions between an outer dimension of bearing 142 and an inner dimension of link aperture 144.

In FIG. 4, joint 300 is in tension. For example, joint 300 may be in tension when the aircraft is flying at cruise altitude and pressurization of a cabin of the aircraft causes fuselage shape changes that permit joint 300 to go into in tension during load reversals. The tensile load pulls fitting 110 against an inner side of shear pin 132. The tensile load also pulls link bar 130 against an inner side of shear pin 132. As can be easily seen by comparing FIG. 3 with FIG. 4, the components of joint 300 move within the free clearance areas during load reversals between compression and tension.

Figure 5:
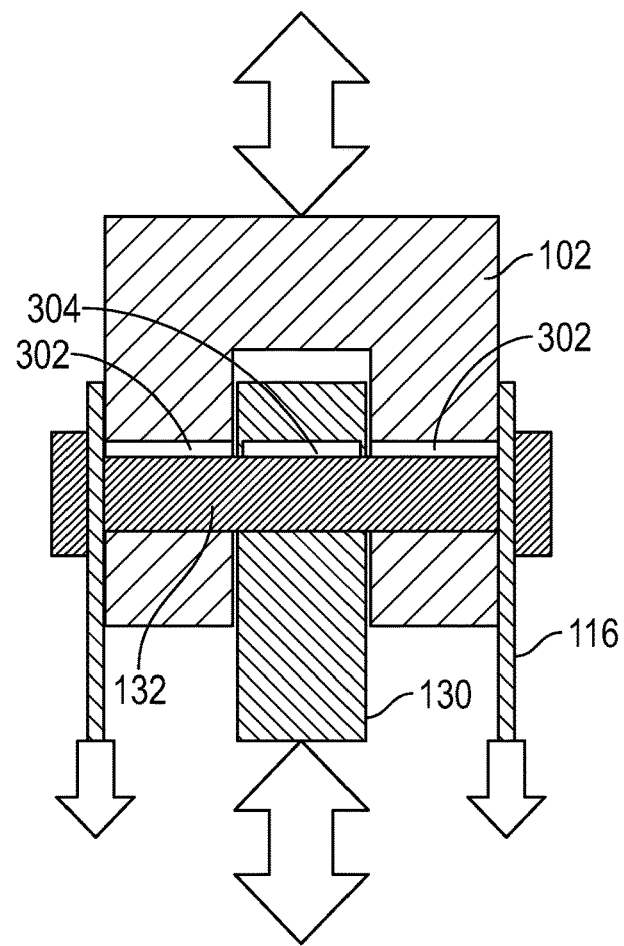

Referring now to FIG. 5, and with continued reference to FIGS. 1-4, joint 106 is illustrated in operating conditions. In the operating conditions where the load on wing 104 is close to zero load (substantially low), straps 116 apply tension to joint 106 to bias link assembly 114 to a limit of the free play clearance 302. Link assembly 114 is in compression during operating conditions from tension in straps 116. For example, even when load reversals on wing 104 would cause link assembly 114 to be in tension, link assembly 114 remains in compression from straps 116 pulling bolt 134 against an inner side of bolt aperture 146 and to the inside of link assembly 114. Accordingly, shear pin 132 is biased against an inner side of fitting aperture 122.

In the example provided, straps 116 are configured to continuously bias link assembly 114 to the limit of the free play clearance during predetermined wing loading conditions of joint 106 during operation of the aircraft. In other words, the expected loads on wing 104 during typical reversals are not sufficient to put the link assembly 114 in tension.

It should be appreciated that the location and size of the free clearances may vary without departing from the scope of the present disclosure. Alternative assembly components may be incorporated in some embodiments.

Figure 6:
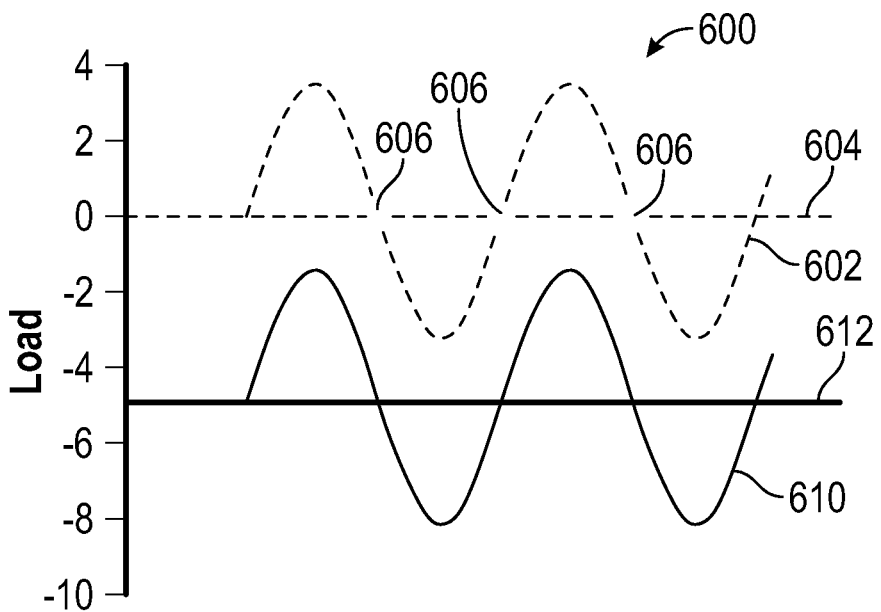
FIGS. 6-7 are graphs illustrating loading of the joint of FIG. 1 during operation of the aircraft assembly.

Referring now to FIG. 6, and with continued reference to FIGS. 1-5, the forces in joint 106 and in joint 300 alternating between compression and tension during operation are illustrated in graph 600. Line 602 represents forces in joint 300. As load reversal occurs about zero load line 604, components of joint 300 move within free clearance areas 302 and 304, represented by zero load box 606. When the components have traversed to the other side of the free clearance areas, the components forcefully contact each other. This forceful contact results in audible noise for occupants of the aircraft.

Line 610 represents forces in joint 106. As load reversal occurs, forces in joint 106 remain in compression as shown in FIG. 6 and biased against one side of the free clearance areas. Accordingly, the forces never reach zero load line 604 and the components do not forcefully contact each other and do not traverse the free clearance area.

Figure 7:
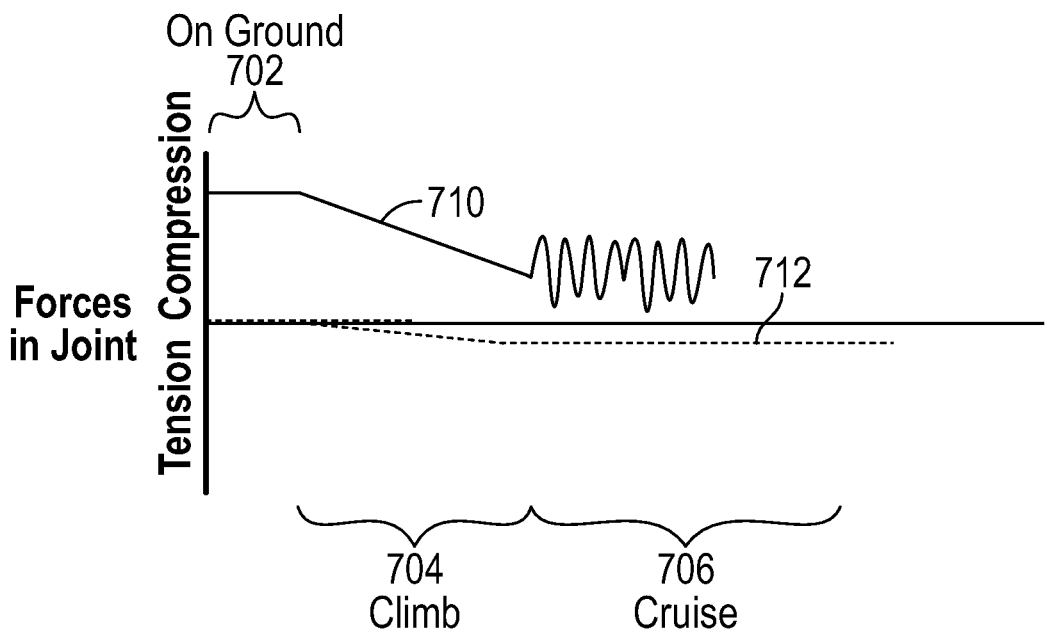

Referring now to FIG. 7, and with continued reference to FIGS. 1-6, forces in joint 106 are illustrated during a flight of the aircraft. The flight has several phases, including on ground taxi phase 702, climbing phase 704, and cruise phase 706. In ground phase 702, forces 710 on link bar 130 are compressive, while forces 712 on strap 116 are substantially zero.

As the aircraft progresses through climb phase 704, the atmospheric pressure decreases and the cabin pressurizes. As pressurization occurs, forces 710 become tensile in joint 106. As link assembly 114 elongates in elastic deformation, strap 116 also elongates and compresses link assembly 114 enough to keep link assembly 114 in compression, but less than enough to make the typical load in link assembly greater than substantially low relative to the designed load capacity of link assembly 114. During the cruise phase 706, turbulence causes load reversal at wings 104. Because straps 116 are biasing link assembly 114, forces 710 do not become tensile.

Figure 8:
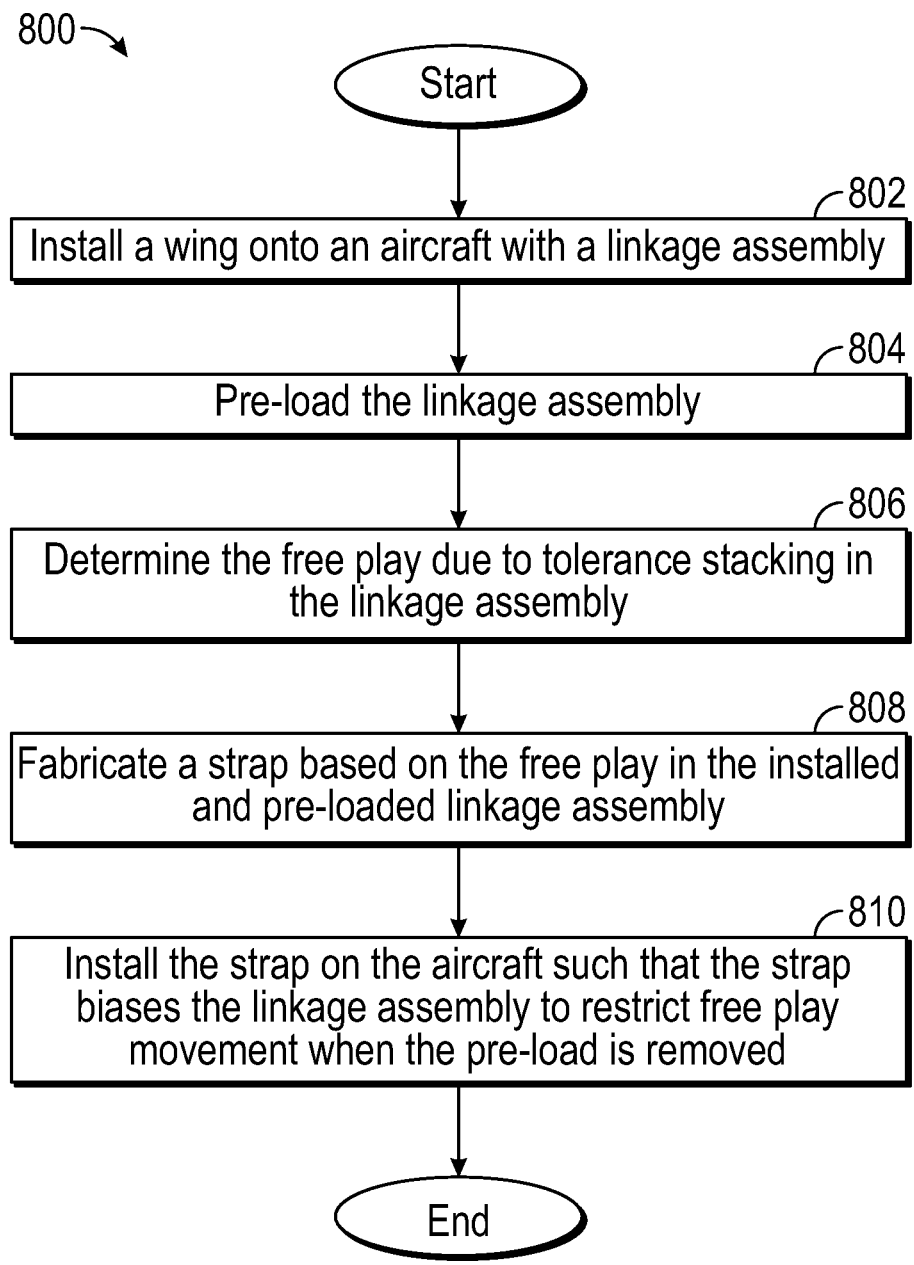
FIG. 8 is a flow diagram illustrating a non-limiting embodiment of a method of reducing noise in linkage assembly in accordance with the teachings disclosed herein.

Referring now to FIG. 8, and with continued reference to FIGS. 1-7, a method 800 of reducing noise in a joint during operation of an aircraft is illustrated in flow diagram form. Task 802 includes installing a linkage assembly between a fuselage and a wing of the aircraft to support the wing. For example, task 802 may include coupling wing 104 to fuselage 102 with joint 106 before installation of straps 116.

Task 804 includes preloading the linkage assembly. For example, joint 106 is pre-loaded while wings 104 support the weight of fuselage 102 on the ground.

Task 806 includes determining a free play clearance in the linkage assembly due to manufacturing tolerance stacking. In the example provided, determining the free play clearance in the linkage assembly is determining the location of the bolt within the linkage assembly after pre-loading the linkage assembly. For example, strap apertures 150 may be marked for drilling based on the locations of bolt apertures 146 in the pre-loaded joint 106.

Task 808 includes fabricating a strap based on the free play clearance. In the example provided, fabricating the strap further includes drilling bolt apertures in the strap based on a location of a bolt within the linkage assembly after pre-loading the linkage assembly. For example, strap apertures 150 may be drilled based on the locations of bolt apertures 146 in the pre-loaded joint 106.

Task 810 includes installing the strap on the linkage assembly such that the strap biases the linkage assembly to restrict free play movement during pressurized flight of the aircraft. For example, straps 116 may be secured to link assembly 114 with bolts 134.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. An aircraft, comprising:
   a fuselage;
   a wing extending out from the fuselage; and a joint coupling the wing to the fuselage, the joint comprising:
   a first fitting fixed to the fuselage;
   a second fitting fixed to the wing;
   a link assembly pivotably coupled to the first fitting and to the second fitting, the link assembly configured to support the wing during operation of the aircraft and having a free play clearance defined by a manufacturing of the joint and falling within a designed dimensional tolerance of the joint; and
   a strap coupled to the link assembly at the first fitting and at the second fitting based on the free play clearance as defined by the manufacturing of the link assembly, the strap further configured to bias the link assembly to restrict movement of the link assembly within the free play clearance during load reversal in the joint.

2. The aircraft of claim 1, wherein the strap is further configured to bias the link assembly to a limit of the free play clearance in an operating state of the aircraft.

3. The aircraft of claim 2, wherein the strap is configured to continuously bias the link assembly to the limit of the free play clearance during predetermined wing loading conditions of the joint during operation of the aircraft.

4. The aircraft of claim 2, wherein the strap is a flat metal bar that elastically deforms to bias the link assembly.

5. The aircraft of claim 1, wherein the first fitting defines a first fitting aperture and the second fitting defines a second fitting aperture, and wherein the link assembly includes:
   a link bar with a first end portion and a second end portion, the first end portion defining a first link aperture and the second end portion defining a second link aperture;
   a first shear pin at least partially disposed within the first fitting aperture and at least partially disposed within the first link aperture; and
   a second shear pin at least partially disposed within the second fitting aperture and at least partially disposed within the second link aperture.

6. The aircraft of claim 5, wherein the free play clearance is at least partially defined by a difference in dimensions between an inner surface of the first fitting aperture and an outer surface of the first shear pin.

7. The aircraft of claim 6, wherein the free play clearance is at least partially defined by a difference in dimensions between an inner surface of the second fitting aperture and an outer surface of the second shear pin.

8. The aircraft of claim 5, wherein the first shear pin and the second shear pin each define a bolt aperture that is coaxial with a longitudinal direction of the respective shear pin, and wherein the link assembly further includes:
   a first bolt securing the strap to the link assembly and disposed at least partially in the bolt aperture of the first shear pin; and
   a second bolt securing the strap to the link assembly and disposed at least partially in the bolt aperture of the second shear pin.

9. The aircraft of claim 8, wherein the strap further defines a first strap aperture and a second strap aperture,
   wherein the first strap aperture has a diameter that is substantially the same as a diameter of the first bolt and is aligned with the first bolt when the link assembly is loaded by a predetermined pre-load, and
   wherein the second strap aperture has a diameter that is substantially the same as a diameter of the second bolt and is aligned with the second bolt when the link assembly is loaded by the predetermined pre-load.

10. A joint for a structure subjected to load reversal between a first structure and a second structure, the joint comprising:
   a first fitting fixed to the first structure;
   a second fitting fixed to the second structure;
   a link assembly pivotably coupled to the first fitting and to the second fitting, the link assembly having a free play clearance defined by a manufacturing of the joint and falling within a designed dimensional tolerance of the joint;
   a strap coupled to the link assembly at the first fitting and at the second fitting based on the free play clearance as defined by the manufacturing of the link assembly, the strap further configured to bias the link assembly to restrict movement of the link assembly within the free play clearance during load reversal in the joint; and
   wherein the strap is further configured to bias the link assembly to a limit of the free play clearance an operating state of an aircraft, wherein the first structure is a fuselage of the aircraft and the second structure is a wing of the aircraft.

11. The joint of claim 10, wherein the strap is configured to continuously bias the link assembly to the limit of the free play clearance during predetermined wing loading conditions of the joint during operation of the aircraft.

12. The joint of claim 10, wherein the strap is a flat metal bar that elastically deforms to bias the link assembly.

13. The joint of claim 10, wherein the first fitting defines a first fitting aperture and the second fitting defines a second fitting aperture, and wherein the link assembly includes:
   a link bar with a first end portion and a second end portion, the first end portion defining a first link aperture and the second end portion defining a second link aperture;
   a first shear pin at least partially disposed within the first fitting aperture and at least partially disposed within the first link aperture; and
   a second shear pin at least partially disposed within the second fitting aperture and at least partially disposed within the second link aperture.

14. The joint of claim 13, wherein the free play clearance is at least partially defined by a difference in dimensions between an inner surface of the first fitting aperture and an outer surface of the first shear pin.

15. The aircraft of claim 14, wherein the free play clearance is at least partially defined by a difference in dimensions between an inner surface of the second fitting aperture and an outer surface of the second shear pin.

16. The joint of claim 13, wherein the first shear pin and the second shear pin each define a bolt aperture that is coaxial with a longitudinal direction of the respective shear pin, and wherein the link assembly further includes:
   a first bolt securing the strap to the link assembly and disposed at least partially in the bolt aperture of the first shear pin; and
   a second bolt securing the strap to the link assembly and disposed at least partially in the bolt aperture of the second shear pin.

17. A method of reducing noise in a joint during operation of an aircraft, the method comprising:
   installing a linkage assembly between a fuselage and a wing of the aircraft to support the wing;
   preloading the linkage assembly;
   determining a free play clearance in the linkage assembly due to manufacturing tolerance stacking;
   fabricating a strap based on the free play clearance; and installing the strap on the linkage assembly such that the strap biases the linkage assembly to restrict free play movement during pressurized flight of the aircraft.

18. The method of claim 17, wherein fabricating the strap further includes drilling bolt apertures in the strap based on a location of a bolt within the linkage assembly after pre-loading the linkage assembly.

19. The method of claim 18, wherein determining the free play clearance in the linkage assembly is determining the location of the bolt within the linkage assembly after pre-loading the linkage assembly.

* * * * *

UNITED STATES PATENT AND TRADEMARK OFFICE
CERTIFICATE OF CORRECTION

| | |
|---|---|
| PATENT NO. | : 11,440,635 B1 |
| APPLICATION NO. | : 17/301800 |
| DATED | : September 13, 2022 |
| INVENTOR(S) | : Vijay Sekhar Kandavalli et al. |

It is certified that error appears in the above-identified patent and that said Letters Patent is hereby corrected as shown below:

In the Claims

Column 8, Line 46, "aircraft" should be changed to --joint--

Signed and Sealed this
Third Day of January, 2023

Katherine Kelly Vidal
*Director of the United States Patent and Trademark Office*